Figure 3:
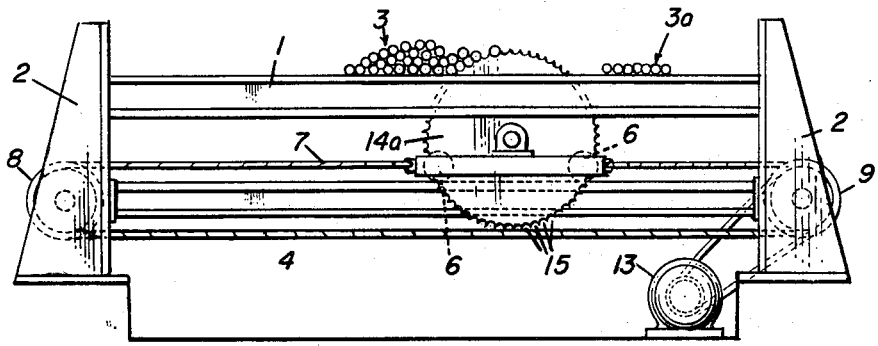

July 26, 1960
O. J. SMEJDA
2,946,463
APPARATUS FOR ARRANGING RODS
Filed April 21, 1959
3 Sheets-Sheet 1
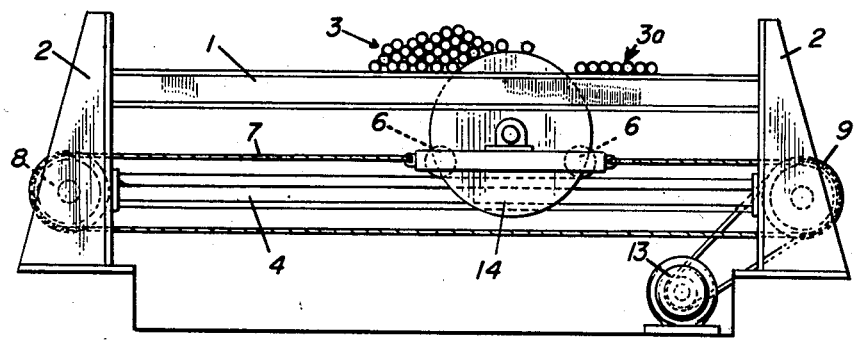
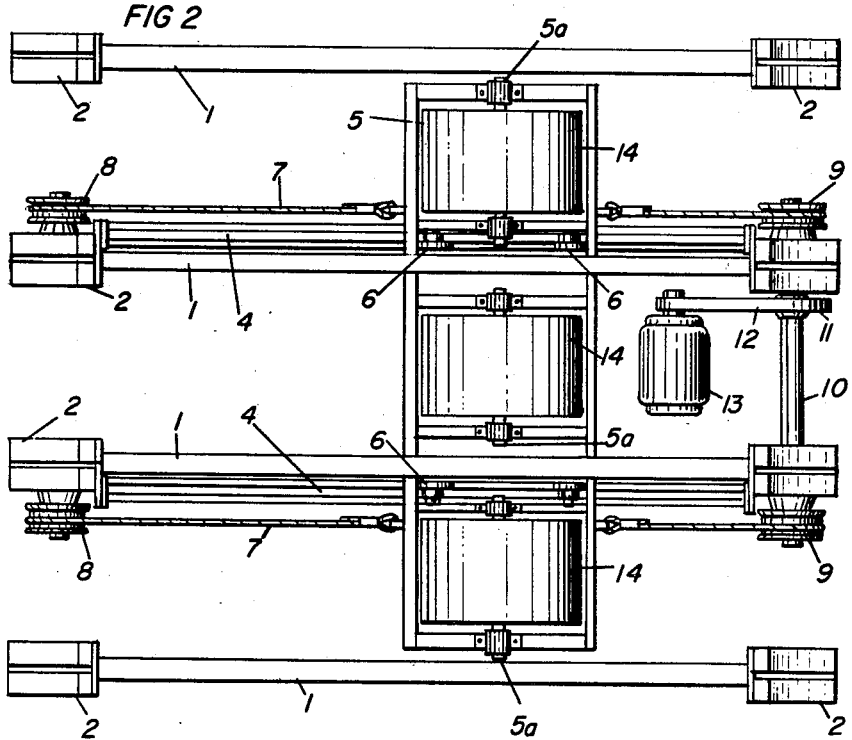
INVENTOR
Oscar J. Smejda
BY *Wendoroth, Lind & Ponack*
ATTORNEYS July 26, 1960  O. J. SMEJDA  2,946,463
APPARATUS FOR ARRANGING RODS
Filed April 21, 1959  3 Sheets-Sheet 2

INVENTOR
Oscar J. Smejda

BY Wenderoth, Lind and Ponack
ATTORNEYS

July 26, 1960 O. J. SMEJDA 2,946,463
APPARATUS FOR ARRANGING RODS
Filed April 21, 1959 3 Sheets-Sheet 3
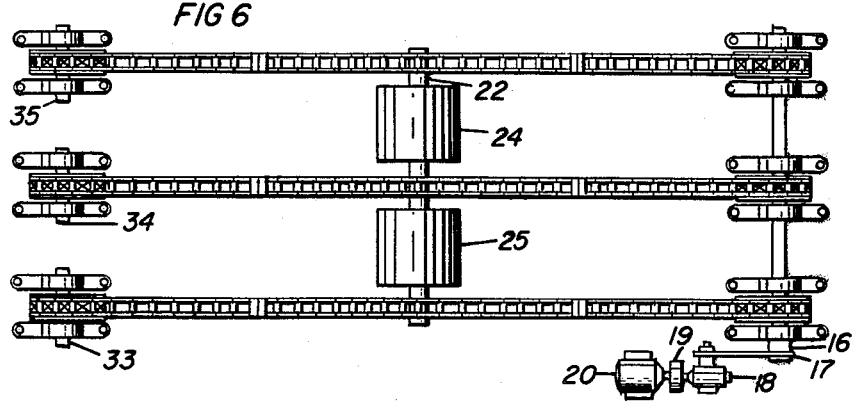
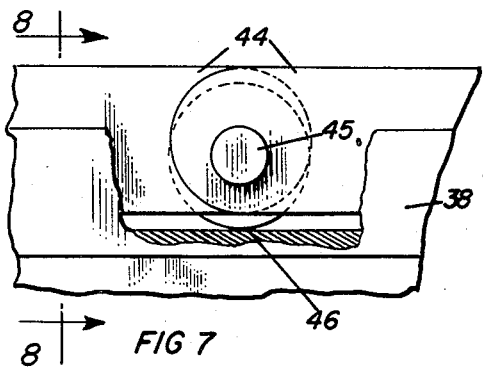
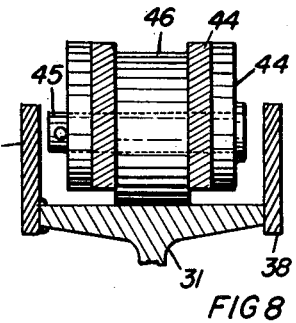
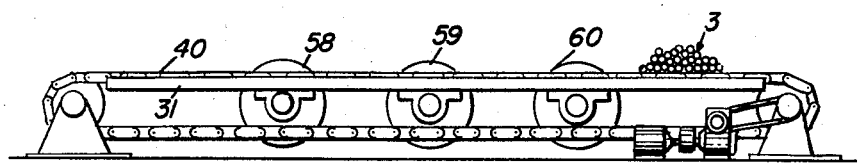
INVENTOR
Oscar J. Smejda
BY Wendenoth, Lind & Ponack
ATTORNEYS

United States Patent Office 2,946,463
Patented July 26, 1960

2,946,463
APPARATUS FOR ARRANGING RODS
Oscar Josef Smejda, Nydalen, Oslo, Norway, assignor to Christiania Spigerverk, Oslo, Norway
Filed Apr. 21, 1959, Ser. No. 807,877
Claims priority, application Norway Mar. 21, 1953
13 Claims. (Cl. 214—1)

The present invention relates to apparatus for arranging a bundle of rods into a layer of rods which is one rod thick, the rods being parallel to each other.

This application is a continuation-in-part of my applications Serial No. 417,155, filed March 18, 1954 and Serial No. 646,631, filed March 18, 1957, now abandoned.

Rods are generally handled in bundles, which bundles may weigh up to 10 tons or more. When the rods are thin, they will become entangled with each other during the handling of the bundles. This is true whether the rods have a round, square or other cross section. It is often necessary to separate the rods in such a bundle and place them in a layer of rods which is one rod thick with the rods parallel to each other and lying side by side. For example, this is necessary when the individual rods are to be fed to a rolling mill. Obviously, this separating can be done by hand, but it requires the labor of at least two workers, and it is not only tedious, but is also very time consuming.

It is an object of the present invention to provide an apparatus which will quickly and easily separate a bundle of rods into a layer of rods which is one rod thick with the rods parallel to each other and lying side by side.

It is a further object of the invention to provide an apparatus which at the same time as it arranges the rods in a bundle in a layer which is one rod thick with the rods parallel and side by side, will sort crooked rods in the bundle from the straight rods in the bundle and will cause the crooked rods to lie on top of the layer of straight rods. This refers especially to rods having a circular cross section.

The apparatus according to the invention comprises a plurality of longitudinally extending substantially horizontal support means upon which the bundle of rods to be sorted is supported with the rods extending in a main direction which is substantially transverse to the direction of the support means. End supports are provided for supporting the ends of the horizontal support means. A mounting means is positioned below the support means, on which mounting means is mounted a plurality of right cylindrical bodies which are freely rotatable about a single axis which is transverse to the longitudinal direction of the support means. There is usually one such cylindrical body between each pair of support means, and the cylindrical bodies project above the level of the ends of the horizontal support means. A driving mechanism is provided which is connected either to the horizontal support means or the mounting means, and which reciprocates the means to which it is connected in a horizontal direction.

The action of the apparatus is such that the movement of the cylindrical bodies against and then beneath the bundle of rods, or the movement of the rods on the support means against and over the cylindrical bodies, lifts the rods in the bundle upwardly and spreads them into a layer of single rods, as a result of which the rods are then able to fall downwardly onto the support means as a layer of rods one rod thick. Repeated movement of the cylindrical bodies or the support means back and forth beneath the rods thus causes the rods to arrange themselves in a layer of rods one rod thick along the support means. Further, any crooked rods which are present in the bundle will be caused to rise out of the layer of rods and lie on top of the layer.

Figure 4:
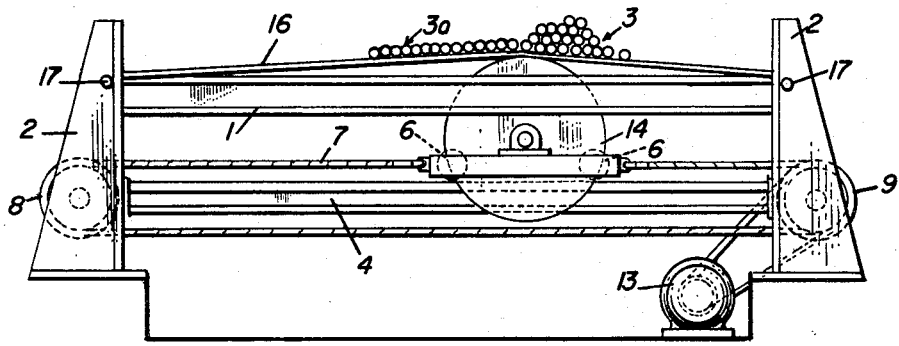
Figure 5:
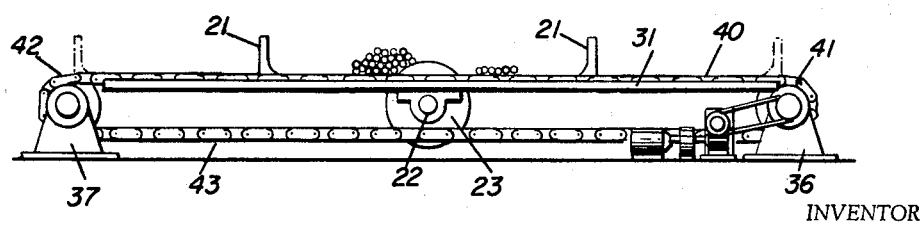

Other and further objects of the present invention will become apparent from the following specification and claims taken together with the accompanying drawings, in which:

Fig. 1 is a side elevation view of an embodiment of the apparatus according to the present invention;
Fig. 2 is a plan view of the apparatus of Fig. 1;
Fig. 3 is a side elevation view of a second embodiment of the apparatus according to the invention;
Fig. 4 is a side elevation view of a third embodiment of the apparatus according to the invention;
Fig. 5 is a side elevation view of a fourth embodiment of the apparatus according to the invention;
Fig. 6 is a plan view of the apparatus according to Fig. 5;
Fig. 7 is an enlarged side elevation view of a detail of the apparatus of Figs. 5 and 6;
Fig. 8 is a section on line VIII—VIII of Fig. 7; and
Fig. 9 is a side elevation view of a fifth embodiment of the apparatus according to the invention.

The embodiment of the apparatus as shown in Figs. 1 and 2 comprises support means in the form of a plurality of longitudinally extending parallel horizontal rails 1, which are supported at their ends by end supports 2. These rails support a bundle of rods 3 which it is desired to arrange in a layer of parallel rods 3a. Beneath the rails 1 is positioned mounting means which comprise a frame 5 having wheels 6 mounted thereon, and on which frame is mounted a plurality of right cylindrical bodies 14, here shown as right circular cylindrical bodies. These bodies are mounted on axially aligned axles 5a, which axles in turn are freely rotatably mounted on frame 5, so that cylindrical bodies 14 are freely rotatable about a single axis which is transverse to the rails 1. There is one cylindrical body 14 between each pair of rails 1, and it projects above the level of the rails 1.

The wheels 6 roll on further rails 4 which are beneath rails 1 and which are also supported at their ends on the end supports 2.

Driving means are provided to reciprocate the frame 5. Connected to the frame 5 are two cables 7 which are run over pulley wheels 8 and 9 mounted on the end supports 2. Pulley wheels 9 are fixed on shaft 10, which is rotatably mounted between two of the end supports 2, and on the shaft 10 is a sprocket wheel 11. Sprocket chain 12 is engaged with the sprocket wheel 11 and is connected to a reversible motor 13.

In operation, the bundle or rods 3 is placed on the horizontal rails 1 with the rods extending transversely to the rails and the motor 13 is started. The frame 5 is drawn by the cables 7 in a direction such that the cylindrical bodies 14 move into the bundle of rods 3 lying across the rails 1 and cause them to be raised. The rods 3 will be distributed singly over the cylindrical surface of the cylindrical bodies 14 which project above the level of the horizontal rails 1, and the rods will thus form themselves into a single layer of parallel rods 3a.

If the bundle of rods is not completely separated into a layer of rods only one rod thick during the first movement of the cylindrical bodies 14 along the length of the horizontal rails 1, the motor 13 is reversed and the cylindrical bodies moved in the opposite direction. The reciprocating movement of the cylindrical bodies 14 is continued until the rods in the bundle are arranged as desired.

The construction of the embodiment shown in Fig. 3 is substantially the same as that of Figs. 1 and 2, except that the cylindrical bodies 14 of Figs. 1 and 2 are replaced by cylindrical bodies 14a which are provided with corrugations 15 in the peripheral surface thereof, the corrugations running parallel to the axis of rotation of the cylindrical bodies 14a. The operation of the embodiment of Fig. 3 is the same as that of the embodiment of Figs. 1 and 2. The rods in the bundle, however, are taken up in the corrugations 15 and carried around the periphery of the cylindrical body 14a one at a time and deposited in the layer of rods 3a.

Substantially the same effect may be obtained by coating the cylindrical body 14 of the embodiments of Figs. 1 and 2 with a frictional material.

The embodiment of the apparatus shown in Fig. 4 is substantially the same as that of Figs. 1 and 2, except that there has been provided a belt 16 for each of the cylindrical bodies 14, each belt passing over the corresponding cylindrical body 14 and being secured to bars 17 extending between the end supports 2 at the level of the ends of the rails 1. As in the embodiment of Figs. 1 and 2, the cylindrical bodies 14 project above the level of the horizontal rails 1, and above the ends of the belts 16 where they are fastened to the bars 17.

The operation of the apparatus of this embodiment is the same as that of the embodiment of Figs. 1 and 2, except that the bundle of rods 3 is placed on the belts 16 rather than on the horizontal rails 1. The cylindrical bodies 14 are then moved back and forth beneath the belts, and the rods 3 will be caused to lie in a layer of rods 3a.

The embodiment of Fig. 5 comprises longitudinally extending substantially horizontal support means in the form of horizontally extending endless chains 40. In place of chains, there may be used flexible bands, belts, etc. Stops 21 are provided on the chains 40, and are spaced from each other. Rails 31 are positioned beneath the longitudinally extending horizontal upper runs of the chains 40, and the rails 31 have upwardly projecting side flanges 38 and 39 welded thereto. The upper runs of chains 40 run on the rails 31 and are guided between the said flanges 38 and 39.

Each of the rails 31 is supported between an end support 36 and an end support 37. Rotatably mounted between the end supports 36 is a shaft 32 on which are mounted sprocket wheels 41, with which the chains 40 are engaged. Shaft 32 is in turn driven by driving means in the form of a chain 17 engaged with a sprocket wheel 16 on the end of the shaft 32. The chain 17 is driven from a reduction gear 18 which in turn is driven by a reversible motor 20 through a magnetic brake 19. It will thus be seen that the driving means drives the horizontal support means in this embodiment.

Sprocket wheels 42 are mounted on stub shafts 33, 34 and 35 in the end supports 37 at the ends of the runs opposite to the end supports 36, and sprocket wheels 42 are also engaged by the chains 40.

Mounting means in the form of bearing hangers 23 and a shaft 22 rotatably mounted therein are provided beneath the upper run of the chain 40. Shaft 22 extends transversely of the chains 40. Right circular cylindrical bodies 24 and 25 are mounted on shaft 22. These cylindrical bodies are thus freely rotatable about an axis which is transverse to the longitudinal direction of the chains 40. It will be noted that there is a stop 21 on the chain 40 on each side of the cylindrical bodies 24 and 25. Further, there is shown one cylindrical body between each pair of chains. The cylindrical bodies project above the level of the upper run of the chains 40.

The details of the construction of the chain itself are shown in Figs. 7 and 8, the chains consisting of pairs of plates 44 spaced from each other transversely of the longitudinal direction of the chain, said pairs of plates being pivotally connected to adjacent pairs of plates by pivots 45. Mounted on the pivots 45 between the plates of adjacent pairs are rollers 46 which roll on the rails 31.

In operation, the bundle of rods is placed on the upper run of the chains 40 with the rods extending substantially transversely of the direction of the runs of the chains, and between the stops 21. The motor 20 is then started and the chain is caused to move first in one direction, the motor then being reversed to cause the chain to move in the opposite direction. The bundle of rods is thereby carried over the freely rotatable cylindrical bodies 24 and 25. The action of the cylindrical bodies on the bundle of rods is the same as that described in connection with the embodiment of Figs. 1 and 2. The stops 21 prevent the rods from being pushed off the ends of the chains.

The embodiment of Fig. 9 is substantially the same as that of Figs. 5 and 6 except that a plurality of right circular cylindrical bodies is provided between each pair of chains 40, the cylindrical bodies being spaced from each other along the length of the chain 40. These cylindrical bodies are illustrated in Fig. 9 as cylindrical bodies 58, 59 and 60. Corresponding cylindrical bodies are mounted between each pair of chains 40.

The operation of the apparatus according to this embodiment is the same as that of the embodiment of Figs. 5 and 6.

Obviously, many possibilities present themselves for the modification of the various embodiments. It is not essential that the horizontal support means of the species of Figs. 5 and 6 and Fig. 9 be flexible chains, it being entirely possible to reciprocate a rigid element. Likewise the horizontal support means of the embodiments of Figs. 1 and 2 and 3 need not be rigid rails. Flexible chains can also be used.

Moreover, the cylindrical bodies need not be right circular cylinders, it being possible to have them of a slightly irregular cross-sectional shape.

In addition to separating the rods in a bundle into a layer the apparatus also acts to sort crooked rods in the bundle from the straight rods in the bundle and to cause the crooked rods to lie on top of the layer of straight rods.

The operation of the device as a rod sorter is as follows. For the purpose of the discussion, it is assumed that the crooked rod lies, for example, on three or four parallel longitudinally extending horizontal support means with an already formed layer of straight rods on either side of it. The ends of the rod project beyond the outermost support means.

For the sake of simplicity it is assumed that the rod has, in the main, the shape of a curve. It is thus possible to speak of the "ends" and the "belly." The belly is assumed to be resting mainly on the support means. The ends may be bent somewhat above or somewhat below the level of the support means, or one end may be above and the other end below the level of the support means.

If the rollers are moved against or under the layer of rods, or the rods moved against or over the roller, pressure will be exerted on the rods, and the following effects will ensue:

(1) If the ends of the crooked rod point upwards above the level of the support means, the layer of straight rods which is nearest to the ends of the crooked rod will wedge itself under these ends. The crooked rod has the requisite counter-pressure exerted thereon by the layer of rods against which the belly rests. When the foremost of the wedging straight rods has reached the center of gravity of the curved rod, running transversely to the support means, the belly will tip up.

By continuing the pressure of the rollers on the rods or the rods on the rollers the two hitherto separated layers of straight rods will meet, while the crooked rod will remain resting on the top of this layer.

The sorting-out has then been completed.

(2) If the ends of the crooked rod point downward below the level of the support means, the layer of straight rods which is nearest to the ends of the crooked rod will force these ends down, thereby forcing the belly up. With continued movement of the rollers or the rods the layer of straight rods, against which the belly has hitherto rested, will now wedge itself in under the belly.

Gradually as the wedging operation proceeds, the belly will be lifted higher above the support means, while the ends still lie underneath the second layer of straight rods.

In the course of this the curved rod will turn on an axis which runs through the supporting points of the curved rod on the outermost support means. The wedging layer of straight rods will at least attain a position where the lever conditions of the curved rod are such that its ends, under the influence of the weight of the belly, swing upwards around the foremost of the wedging straight rods, the ends being released by the tipping away of the straight rods which were resting on it. With continued movement of the rollers or the rods the two hitherto separated layers of straight rods will meet, while the crooked rod will remain resting on the top of this layer.

Sorting-out has then been completed.

(3) If one of the ends of the crooked rod points upwards above the level of the support means, while the other end points downwards below the suport means, the processes described in (1) and (2) will take place simultaneously, and the crooked rod will likewise come to rest on the top of the layer of straight rods, whereby the sorting-out will be completed. Thus sorting-out of crooked rods is effected by the rods wedging themselves out of and onto the layer of straight rods.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A device for arranging a bundle of rods into a layer of parallel rods comprising a plurality of longitudinally extending substantially horizontal support means for supporting a bundle of rods in a direction transverse to the direction of said support means, end supports supporting said horizontally extending support means, a mounting means positioned below said support means, a plurality of right cylindrical bodies freely rotatably mounted on said mounting means about a single axis transverse to the longitudinal direction of said support means, said cylindrical bodies projecting above the upper level of the ends of said horizontal support means, and a driving mechanism connected to one of said means for reciprocally moving one of said means relative to the other in a horizontal direction.

2. An apparatus for arranging a bundle of rods into a layer of parallel rods comprising a substantially horizontal support means for supporting a bundle of rods in a direction transverse to the direction of said support means, end supports supporting the ends of said support means, a frame positioned below said support means, rail means connected between said end supports on which said frame is movably mounted for movement parallel to the direction of said support means, a plurality of axles on said frame, a plurality of right cylindrical bodies freely rotatably mounted on said axles with the upper part of said cylindrical bodies projecting above the level of the points at which said support means are connected to said end supports, and means connected to said frame for moving said frame back and forth in a direction parallel to said support means.

3. An apparatus as claimed in claim 2 in which said support means comprises a plurality of spaced parallel support members, said cylindrical bodies projecting above said support elements through the spaces between them.

4. An apparatus as claimed in claim 3 wherein said bodies have corrugations on their circumferential surface extending parallel to the axis of the bodies.

5. An apparatus for arranging a bundle of rods into a layer of parallel rods comprising support means including a plurality of horizontal support rails for supporting a bundle of rods in a direction transverse to the direction of said support rails, end supports supporting the ends of said support rails, a frame positioned below said support rails, rail means connected between said end supports on which said frame is movably mounted for movement parallel to the direction of said support rails, a plurality of right cylindrical bodies freely rotatably mounted on said frame about a single axis with the upper part of said cylindrical bodies projecting above the level of the points at which said support rails are connected to said end supports, said support means further including a plurality of flexible elements extending substantially parallel to said support rails and passing over said cylindrical bodies, and means connected to said frame for moving it back and forth in a direction parallel to said support rails.

6. An apparatus as claimed in claim 5 wherein said flexible elements are attached at their ends level with the upper surface of said support rails.

7. An apparatus as claimed in claim 5 wherein said flexible elements each consist of a belt.

8. A device for arranging a bundle of rods into a layer of parallel rods comprising a plurality of longitudinally extending horizontal support means for supporting a bundle of rods in a direction transverse to the direction of said support means, mounting means positioned below said support means, a plurality of right cylindrical bodies freely rotatably mounted on said mounting means about an axis transverse to the longitudinal direction of said support means, said cylindrical bodies projecting above the level of said horizontal support means, and a driving mechanism for reciprocally moving said support means relative to said mounting means in a direction parallel to said longitudinally extending horizontal support means.

9. A device as recited in claim 8 in which said longitudinally extending substantially horizontal support means are flexible elements, and fixed horizontal rails fitted below said horizontal flexible elements for support of the flexible elements.

10. A device as recited in claim 9 in which said rails have lateral upright flanges thereon for lateral guidance of the flexible elements.

11. A device as recited in claim 9 in which said flexible elements are in the form of endless, flexible chains, and a sprocket wheel located at the ends of said rails which serve for support of the upper course of the chains over which sprocket wheel said chains are carried.

12. A device as recited in claim 11 in which said chains are in the form of joined pairs of plates having joint pivots therebetween and rollers fitted on said joint pivots.

13. A device for arranging a bundle of rods into a layer of parallel rods comprising a plurality of longitudinally extending horizontal support means for supporting a bundle of rods in a direction transverse to the direction of said support means, mounting means positioned below said support means, a plurality of groups of right cylindrical bodies, each group freely rotatably mounted on said mounting means about an axis transverse to the longitudinal direction of said support means, said groups being spaced longitudinally along the length of said horizontal support means, said cylindrical bodies projecting above the level of said horizontal support means, and a driving mechanism for reciprocally moving said support means relative to said mounting means in the direction parallel to said longitudinally extending horizontal support means.

No references cited.